United States Patent

[11] 3,588,837

[72] Inventors Ross D. Rash
Bloomington;
Duane H. Anderson, St. Paul; Hilding E. Nelson, Scandia; Paul D. Byrns, Stillwater, Minn.

[21] Appl. No. 787,955
[22] Filed Dec. 30, 1968
[45] Patented June 28, 1971
[73] Assignee Said Kash, said Anderson and said Nelson assignors to Comcet Incorporated
St. Paul, Minn.
fractional part interest to each

[54] SYSTEMS ACTIVITY MONITOR
8 Claims, 5 Drawing Figs.

[52] U.S. Cl. .......... 340/172.5
[51] Int. Cl. .......... G06f 11/00
[50] Field of Search .......... 340/172.5; 235/157

[56] References Cited

UNITED STATES PATENTS

| | | | |
|---|---|---|---|
| 3,303,471 | 2/1967 | Duncan et al. | 340/172.5 |
| 3,322,940 | 5/1967 | Barker et al. | 340/172.5X |
| 3,344,408 | 9/1967 | Singer et al. | 340/172.5 |
| 3,351,910 | 11/1967 | Miller et al. | 340/172.5 |
| 3,377,471 | 4/1968 | Althaus et al. | 340/172.5X |
| 3,390,380 | 6/1968 | Cooke et al. | 340/172.5 |
| 3,438,004 | 4/1969 | Laviron | 340/172.5 |

*Primary Examiner*—Paul J. Henon
*Assistant Examiner*—R. F. Chapuran
*Attorney*—Alfred E. Hall

ABSTRACT: An instrumentation circuit for measuring the activity of all major data paths and other signals within a system against a time interval utilizing sampling techniques with the instrumentation dynamically recording a number which represents the ratio of the number of samples revealing a signal compared to the number of samples taken during the time interval whereby the activity on all potential queuing points within a dynamic environment is accurately recorded in order to provide accurate statistical data concerning the utilization of the data processing and communications equipment.

INVENTORS
ROSS D. RASH
DUANE H. ANDERSON
HILDING E. NELSON
PAUL D. BYRNS

BY Alfred E. Hall
ATTORNEY

INVENTORS
ROSS D. RASH
DUANE H. ANDERSON
HILDING E. NELSON
PAUL D. BYRNS

INVENTORS
ROSS D. RASH
DUANE H. ANDERSON
HILDING E. NELSON
PAUL D. BYRNS

INVENTORS
ROSS D. RASH
DUANE H. ANDERSON
HILDING E. NELSON
PAUL D. BYRNS

SYSTEMS ACTIVITY MONITOR

BACKGROUND OF THE INVENTION

With computers ever increasing in size and complexity, there is a pressing need in the prior art today for a simple economical device which will enable the efficiency of the computers to be determined through monitoring, analyzing and evaluating the performance of the system as well as the activity of all major data paths within the system. Data processing and digital communications equipment which are presently available provide no method of recording activity other than with externally connected computers or counters and timers. Further, such systems require programmed instructions to monitor channel activity. Thus, there is no accurate way in which users of present equipment can record actual system activity economically over a period of time without significantly degrading system operation. Therefore, a monitoring device is required which will permit the activities of the computer or the system in question to be observed without interference, interruption or modification of the program. The device must be able to analyze a complete range of system performance including Input-Output (I.O.) channel activity and memory use as well as the central processing unit performance.

Thus, the Central Processing Unit (CPU) may have, as an example only, four different processor states which a systems activity monitor, or SAM instrumentation as it may be called, should be designed to monitor and record. These processor states may be designated Interrupt, Executive or Supervisor, Problem or Worker, and Wait or Idle.

The Interrupt state of the processor is the state which the processor assumes when responding to asynchronous external events. The instrumentation for the interrupt state will measure the time that the processor has spent in this state expressed as a number directly related to percentage of activity, i.e. represents the ratio of the number of samples revealing a signal on the interrupt data path compared to the number of samples taken during a fixed time interval.

It is old and well known in the computer art that a digital signal may be high or low or positive or negative. Therefore, the word "signal" as used throughout this application is intended to include any specified signal of a predetermined level and polarity.

The Executive or Supervisor State in the processor is the state when data communications work tasks are being scheduled for the Problem State to be executed. The instrumentation for the Executive State will measure the time that the processor has spent in this state expressed as a number directly related to percentage of activity. This information can be extremely useful for the systems designer and for the user of the processing system. When a processing element is existing in an Executive System state, system overhead tasks are being performed. Therefore, it is desirable to keep this time at a minimum. However, it is extremely difficult, if not almost impossible, for a systems designer to accurately estimate this time since it consists of short asynchronous tasks which are initiated from multiple sources. The instrumentation techniques disclosed herein will automatically develop a sum of these times for both the visual display and the processing unit at regular intervals.

The instrumentation for the Problem or Work State performs in the same manner as in the Intercept and Executive state. The instrumentation will measure the time that the processor has spent in this state expressed as a number directly related to percentage of activity. To the user this is invaluable information and both visual and statistical data are provided which determines the actual work being accomplished.

The Wait or Idle State within the processor is the time period in which the CPU program is idle. The processor has a Wait or Idle State when there is no further work to be performed in any one of the above mentioned three states. These periods of time are summed by the instrumentation and are expressed as a number directly related to percentage of activity.

The instrumentation to be provided for the memory element will consist of measuring over a time interval the actual work being performed by the memory system versus the work that could have been performed. The memory performs work in increments known as memory cycles. The instrumentation will measure the actual versus the potential amount that could have been achieved. As in the processor case, the value expressed as a percentage will be displayed as a vertical bar on a cathode-ray tube display device. Additionally, a processing element can capture the average value of the memory work level at any time it desires.

I/0 channel activity is monitored using both input data and the output data.

The visual aspects of the instrumentation systems are such that the users may visually observe the actual system activity and compare the relative work being accomplished on any particular channel. The instrumentation modules do not generate significant additional work or add to the system overhead. At the discretion of the user, accurate samples of system activity may be gathered for recording and transmitting to any standard peripheral equipment or to another system. Thus, the instrumentation equipment will allow a data processing user to determine exactly where any system unbalance occurs, the approximate time when it occurred, and the length and the time of the occurrence.

Further, the instrumentation equipment will show if ineffective systems design has been employed by the user personnel and it will point at the proper corrective action for maximum data transfer through the system. As an example, by visual display and recording of the activity within the memory module over an extended period of time, if it is shown that the memory is actually working only at approximately 55 percent of its maximum theoretical value, the systems engineer immediately knows that the memory is capable of approximately 45 percent more work activity.

One of the most important considerations to the customer concerns the communications network. With a very small amount of systems overhead, the processor can measure the actual work load at any interface which is a comparison of the actual amount of data being transmitted over any given circuit against the potential maximum. It could be very easily determined how much additional traffic the circuit could bear and the effect it would have on system response time. By correlating the major instrumentation points within the system, the systems engineer can determine what percent of system capability various processor activities occupy and the individual breakdowns of each. This information can be utilized to provide an accurate profile of system activity and queues from which the system can be balanced for optimum work throughout.

SUMMARY

In the preferred embodiment, the present invention accomplishes the purposes described above by scanning repeatedly the digital outputs from a plurality of channels to be observed. As each channel is scanned over a set period of time, the number of digital signals appearing on the channel during that period of time is stored in a particular area in a temporary memory. Thus, each channel being scanned has its own particular area in the memory and, as it is repeatedly scanned, any new digital signals appearing on that channel are added by digital count to the number previously stored in the temporary memory. At some regular time interval for instance every 10 seconds, the data stored in the temporary memory is transferred to the main computer memory. The data in the main computer memory is coupled to a cathode ray tube which displays the data in the form of vertical bar charts. Thus, the information appearing on the cathode-ray tube screen in the form of the bar charts is updated every 10 seconds when the data from the temporary memory is stored in the main computer memory.

In order to reduce errors due to nonrandom sampling and prevent synchronism between the observed pulses and the observing frequency, a different clock frequency is used in the Central Processing Unit than is used in the Systems Activity Monitor.

Further, a temporary storage memory is used to prevent loading down the main memory with continual storage of the high speed observations. The contents of the temporary memory is dumped periodically into the main memory. The errors due to nonsampling during the dump cycle are minimized by making the dump time small with respect to the sampling period.

A manual selector will enable the operator to display bar charts for 32 different channels at any one time on the cathode-ray tube screen. Thus, any number of positions may be monitored with the operator having the capability of viewing 32 of the positions at any particular time.

In another embodiment, if it is desired to avoid using the temporary memory for a storage circuit, R.C. time constant circuits may be used which, if they have a long enough time constant, will provide sufficient storage time to enable the analog data to be converted to digital data and then coupled directly to the main computer memory.

Thus, it is an object of the present invention to provide a circuit which is simple and economical and which will permit the degree of activity of a device to be observed without significant interference, interruption or modification of the operation of the device.

It is a further object of the present invention to provide a simple and economical circuit for use with a computer system which will permit studies on the percentage of available storage cycles used, the times each subsystem is used and the CPU states used.

It is still another object of the present invention to provide a simple and economical instrumentation system which will utilize output signals from individual channels to analyze a whole range of system performance including I.O. channel activity and memory use as well as central processing unit performance.

It is yet another object of the present invention to provide a computer system performance recorder which dynamically records the average percentage of utilization of a data path against the potential maximum whereby the activity on all potential queuing points within a dynamic environment is recorded in order to provide accurate statistical data concerning the utilization of the data processing and communications equipment.

It is still another object of the present invention to utilize a different clock frequency in the Central Processing Unit than the clock frequency used in the System Activity Monitor in order to reduce errors due to nonrandom sampling.

It is still a further object of the present invention to provide a temporary memory for storage of observed data the contents of which is transferred to the Main Computer Memory periodically whereby loading down of the main memory is prevented.

BRIEF DESCRIPTION OF THE DRAWINGS

These and other more detailed and specific objectives will be disclosed in the course of the following specification reference being had to the accompanying drawings in which.

DESCRIPTION OF THE PREFERRED EMBODIMENT

Figure 1:
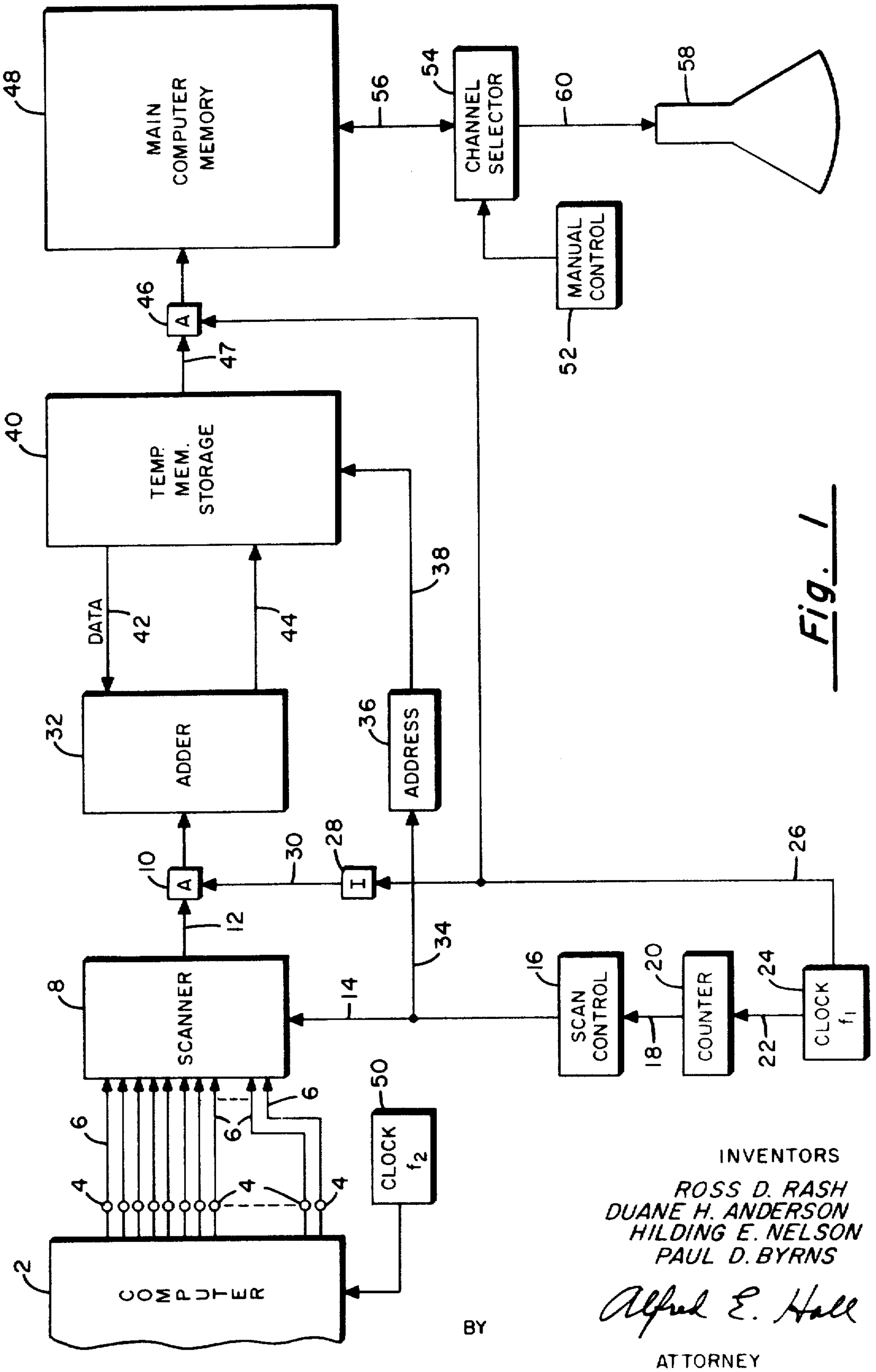
FIG. 1 discloses the preferred embodiment of the present invention.

A Central Processing Unit 2 or any other device which may be producing electrical logic signals may have several hundred different signal producing channels 4 which carry logic signals which are active in varying degrees. It may be desirable to know the activity, or degree of use, of signals on various points within the system by monitoring the various locations 4. Thus, the signals present at locations 4 are coupled via lines 6 to scanner 8. In turn, scanner 8 couples the signals on only one of the lines 6 to AND gate 10 via line 12 depending upon the signals present on line 14 from Scan Control 16. Scan Control 16 is driven by the signals on line 18 from Counter 20 which, in turn, is controlled by the signals on line 22 from Clock 24. Every 10 seconds, as an example only, as will be explained more fully hereinafter, Clock 24 stops for a fixed period such as 1 millisecond and produces a signal on line 26 during that time. At all other times however no signal is present on line 26 and therefore Inverter 28 during those other times will produce an output on line 30 which is coupled as an enable signal to AND gate 10. Thus as long as Clock 24 does not produce a signal on line 26 AND gate 10 is enabled which allows the selected signals from line 6 to pass through Scanner 8 and AND gate 10 to Adder 32. It is obvious that the signals present on lines 12 and 30 must be gated at a specific time by a gating signal not shown. It should be noted also that the output of Scan Control 16 which is used to select a particular line 6 from Central Processing Unit 2 is also coupled via line 34 to Address Register 36. The output from Address Register 36 on line 38 is coupled to the Temporary Memory Storage Unit 40. Thus it can be seen that any signals from Scan Control 16 which are used to select a particular line 6 from the Central Processing Unit 2 are also used through Address Register 36 to select a particular area in the Temporary Memory Storage Unit 40. The contents of the Memory Storage at that address is coupled via line 42 to the Adder 32. Any digital data signals which may be present on the selected line 6 are passed through AND gate 10 to Adder 32 where they are added to whatever count is stored at that particular address in Memory and is then restored in Memory via Line 44. Thus the data at any particular address in Memory 40 which has been selected by Scan Control 16 is continually updated by any incoming data on a particular line 6 selected by Scanner 8.

It will therefore be recognized that for any particular channel or point to be monitored there is a corresponding area in memory which will store the number of any additional signals appearing on that particular channel whenever it is being monitored.

As stated earlier, every 10 seconds clock 24 stops for a fixed period of time such as 1 millisecond. The value of 10 seconds was used purely for purposes of illustration and does not necessarily represent an actual working period although it could. This 10-second period which is used as an example represents the time for any storage register in the temporary memory to store the maximum number of samples that could be taken or all "one's" and, therefore, would represent 100 percent activity of that particular channel being monitored. Suppose, for example, that a signal appearing on line 6 from the central processing unit 2 is being sampled at the rate of 3.2 cycles per second. In 10 seconds 32 pulses would have been registered if the channel were utilized at 100 percent activity. (This means that a register in the temporary memory would be required to be of sufficient length to count 32.) Thus, at the end of the 10-second period, if the "one's" in the register are counted, they will indicate the percent that the channel has been active during the 10-second period. Thus if a 001000 is stored in the register it indicates that eight pulses have been received and thus the channel has been 25 percent active. If a 010000 is found in the register, this would indicate that 16 pulses have been received and therefore the channel has been 50 percent active. It will therefore be seen that the length of the register determines the point at which 100 percent activity is established and, if course, this length will depend upon the accuracy desired and the frequency at which the observed information is being sampled. Thus the longer the register in the temporary memory, the more accurate the measurement. Therefore, the activity value (AV) of any channel being monitored is an unsigned number in the range from 0 to a number representing the length of the register.

At the expiration of a fixed period of time, in this case 10 seconds, which is the period in which a fully active channel would obtain an AV of 32 if the sampling of the data occurred at 3.2 c.p.s., the sampling is suspended and the AV's are dumped into the main memory of the CPU via AND gate 46. The data signals from the Temporary Memory 40 are on line 48 and the enable signal to AND gate 46 is the signal on line 26 from Clock 24. It is obvious that AND gate 46 is shown for purposes of simplicity and illustration only; however, the actual manner in which the data from the Temporary Memory 40 is transferred to the Main Computer Memory 48 is old and well known in the art.

Since the System Activity Monitor utilizes what is basically a polling or sampling process, the AV's are beset by the statistical errors caused by sample size, built-in bias, nonrandom polling and lack of polling during the dump cycle.

The errors due to sample size can obviously be minimized by the size of the sample taken. Thus the probable error (E) of a poll based on a random sample (other things ignored) is related to the size of the sample taken (N) by the following formula:

$$E=\frac{1}{\sqrt{N}}$$

Thus, for an N of 65,535 (16 bits, full count), E is equal to approximately 0.4 percent.

The errors due to built-in bias are caused by the fact that, for example only, a 5-bit register can actually store only 31 states and a cleared position representing the 32nd state of "0." Thus, as stated earlier, for a 5-bit register the error would be 1 divided by 32 or approximately 3.2 percent. For a 9-bit register, the error would be 1/512 or approximately 0.2 percent. Thus it is obvious that these errors can be minimized by using large length registers.

The errors due to nonrandom polling, or lack of randomness, are extremely difficult to predict. If a random clock were used to drive the system activity monitor, the situation would be ideal. In actual practice, an attempt is made to minimize the errors due to nonrandom polling by using a different clock frequency in the Central Processing Unit than is used in the System Activity Monitor. Thus Clock 24 which drives the System Activity Monitor in FIG. 1 operates at a first frequency, $f_1$, while Clock 50 which drives the Central Processing Unit, operates at a different frequency, $f_2$. As examples, the frequency of Clock 50 might be 4.44 megacycles while the basic frequency of Clock 24 which drives the system activity monitor may be 4.0 megacycles.

The errors due to nonsampling during the time the data in the Temporary Memory is being dumped in the Main Memory can be minimized by making the dump time small with respect to the sampling. Thus in the example used, if the sampling period is 10 seconds and the dump period is 1 millisecond, then the error is 0.01 percent.

The Temporary Memory Storage Unit 40 is utilized instead of dumping the data directly into the Main Computer Memory because of the high speed of observations. These observations occur at a rate which, if they were dumped directly into the Main Memory, would load down the Main Memory and prevent any other information from being stored therein. By utilizing the Temporary Memory to store observations recorded over a period of time, such as for example 10 seconds, and then utilizing 1 millisecond to transfer this data into the Main Memory, the Main Memory can utilize the remainder of the 10 seconds to perform other operations. Thus, the act of measuring the AV does not significantly affect the accuracy of the measurement because the data in the Temporary Memory is transferred to the Main Memory during a short period of time compared to the overall sampling period.

The data from the Temporary Memory Storage Unit 40 is placed, for example, in the Main Computer Memory 48 in a 256-byte area. Thus the 256-byte area is composed of eight groups of 32 bytes each. Any of the 32-byte groups may be selected by the operator utilizing Manual Control 52 on Channel Selector 54 which causes the selected byte to be transferred to Channel Selector 54 via line 56. Channel Selector 54 is then so coupled to cathode-ray tube 58 via line 60 that the data in the selected 32-byte group is displayed on the cathode-ray screen in the form of 32 bar charts, each bar representing the activity of a particular channel being monitored. When the operator utilizes Manual Control 52, he may select any one of the 32-byte groups as stated earlier and cause that group to be displayed on the screen of cathode-ray tube 58.

Figure 2:
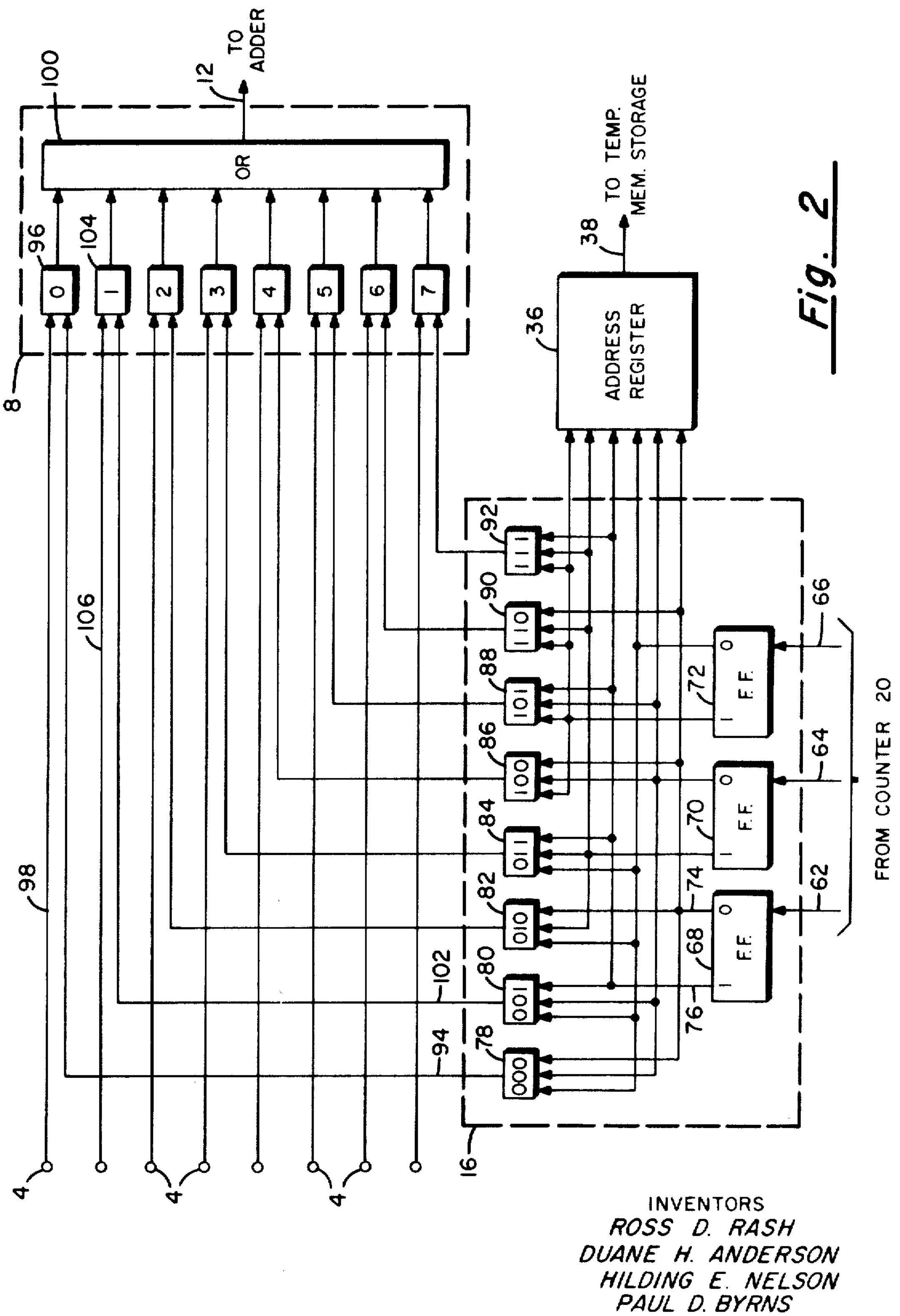
FIG. 2 discloses the circuit details of the scan control circuit and the scanner circuit shown in block form in FIG. 1.

FIG. 2 discloses the circuit details of the Scan Control Circuit and the Scanner Circuit shown in block form in FIG. 1. Assume, for purposes of example only, that Counter 20, shown in FIG. 1, is an 8-bit counter and produces output signals on lines 62, 64 and 66 shown in FIG. 2 which are coupled to flip-flops 68, 70 and 72 respectively. These flip-flops may be of the self-clearing type which is well known in the art and therefore is not shown in detail in FIG. 2. If flip-flop 68 is cleared, it produces an output on line 74 from the "0" side of the flip-flop while, if it is set, it produces an output on line 76 from the "1" side of the flip-flop. Thus Scan Control Unit 16 is a decoder which in the example shown accepts a 3-bit input and produces an output from one of eight AND gates 78, 80, 82, 84, 86, 88, 90 and 92. Thus if all three of the flip-flops 68, 70, and 72 are cleared, AND gate 78 produces an output on line 94. The signal on line 94 is coupled to AND gate 96 in scanner 8 which then gates any data present on line 98 from the Central Processing Unit through OR gate 100 in Scanner 8 to the Adder 32 via line 112 and AND gate 10 as shown in FIG. 1. In like manner, if flip-flop 68 in Scan Control 16 is the only flip-flop set, AND gate 80 in Scan Control 16 produces an output on line 102 which enables AND gate 104 in Scanner 8 to cause any data on line 106 from the Central Processing Unit to be coupled to the Adder. Each of the remaining AND gates 82 through 92 in Scan Control 16 operate in a similar manner to select one of the data lines from the Central Processing Unit and cause the data thereon to be transferred to Adder 32 shown in FIG. 1.

Thus Counter 20, shown in FIG. 1, is continuously driven by clock 24 and produces signals which cause Scan Control 16 to produce output signals which continuously and repeatedly scan the selected channels from the Central Processing Unit sequentially and cause them to be stored in separate locations in the Temporary Memory. Obviously, Clock 24 must cause Counter 20 and Scan Control 16 to operate at a different frequency than the signals appearing on line 6 from Central Processing Unit 2 in order to have a reasonable degree of accuracy.

Figure 3:
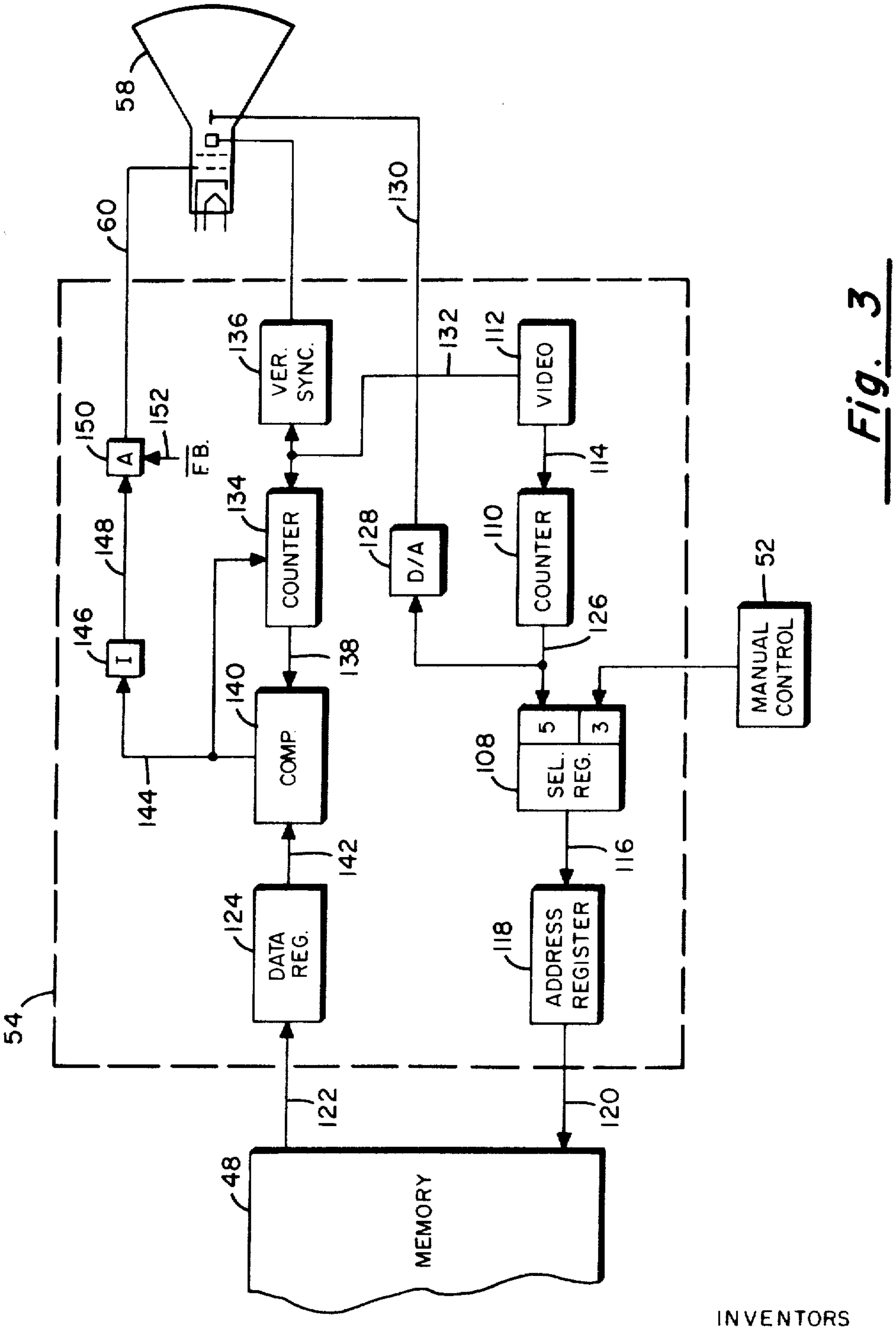
FIG. 3 discloses the details of the channel selector circuit shown as a block in FIG. 1.

FIG. 3 discloses the details of the Channel Selector Circuit shown as a block in FIG. 1. Selector Register 108 is composed of two sections, the first comprising, for example, three bits which are manually controlled and the second portion containing five bits which are automatically controlled by Counter 110. Thus the three bits which are manually controlled select one of the eight groups of 32 bytes in the Memory 48 and the five bits in selector register 108 select the particular one of 32 channels represented in the 32-byte group. Video Circuit 112 produces signals on line 114 which causes Counter 110 to continuously and sequentially change the data in the 5-bit portion of Selector Register 108 to indicate any one of 32 desired channels. As stated previously, the operator by adjusting manual control 52 can cause any one of eight counts to appear in the 3-bit portion of the Selector Register 108 thus selecting any one of the eight 32-byte groups. The eight bits in Selector Register 108 are coupled to via line 116 the Address Register 118 which produces signals on line 120 that causes the selected data to be read out of the appropriate location in Memory 48 on line 122 where it is stored temporarily in Data Register 124. The output of Counter 110 on line 126 which selects any one of the 32 channels in any 32-bit group is also coupled to D-A converter 128 which produces an output on line 130 that causes the cathode-ray tube beam to be positioned horizontally in any one of two positions.

At the same time that Video Circuit 112 is causing Counter 110 to select one of the 32 channels, it is also producing a signal on line 32 which is coupled to Counter 134 and Vertical Synch Circuit 136. The Vertical Synch Circuit 136 causes the beam to start moving vertically at a horizontal location determined by D-A Converter 128. Counter 134 then begins to count from 0 and the output is coupled via line 138 to Comparator 140. The other input to Comparator 140 is the output of Data Register 124 on line 142. It will be remembered that the data stored in Data Register 124 represents the activity value of the selected channel in the form of an unsigned number in the range from 0 to a value representing the maximum number that could be stored in the register, i.e. 31 for a 5-bit register or 511 for a 9-bit register. If the output of Counter 134 is less than the output of Data Register 124 there is no output from Comparator 140 on line 144 and thus Inverter 146 produces an output on line 148 which is coupled as an enable signal to AND gate 150. In the event that the electron beam of the cathode-ray tube is not in the flyback state, a signal is present on line 152 which is also an enable signal to AND gate 150 which then produces an output on line 60 which is coupled to the cathode-ray tube as an intensity control signal. However, when the count in Counter 134 is equal to the count stored in Data Register 124, Comparator 140 produces an output on line 144 which is coupled to Counter 134 to stop the Counter at that particular count and is also coupled to Inverter 146 which removes the enabling signal present on line 148. Thus the intensity signal which was present on line 60 from AND gate 150 is removed and the beam is blanked thus limiting the vertical sweep of the beam to a value representing the activity value stored in data register 124. Obviously, a full count in Counter 134 would represent a 100percent sweep of the beam on the screen of cathode-ray tube 58 and thus would cause a bar representing 100percent to be registered on the face of the tube. Therefore, if for example, Data Register 124 were five bits in length and were storing a value representing a count of 16, when Counter 134 began to count and the cathode-ray tube beam began to sweep upwards in the vertical direction, when Counter 134 reached a count of 16 the beam would be halfway up the cathode-ray tube screen and at that time would be blanked to prevent any further visible movement of the beam as it progresses up the remainder of the screen. Thus, 50 percent would be represented.

Thus, it can be seen from FIG. 3 that the operator can select any one of eight groups of 32 bytes of information representing 32 channels which are being monitored and these eight groups of 32 channels can be individually presented on the face of the cathode-ray tube screen for a visual monitor or indication of the activity on each particular channel. As stated earlier, the embodiment in FIG. 1 utilizes a Temporary Storage Memory in order to avoid the necessity of dumping the data directly into the Main Computer Memory because of the high speed of observations. As pointed out, these observations occur at a rate which, if they were dumped directly into the Main Memory would load down the Main Memory and prevent any other information from being stored therein.

Figures 4, 5:
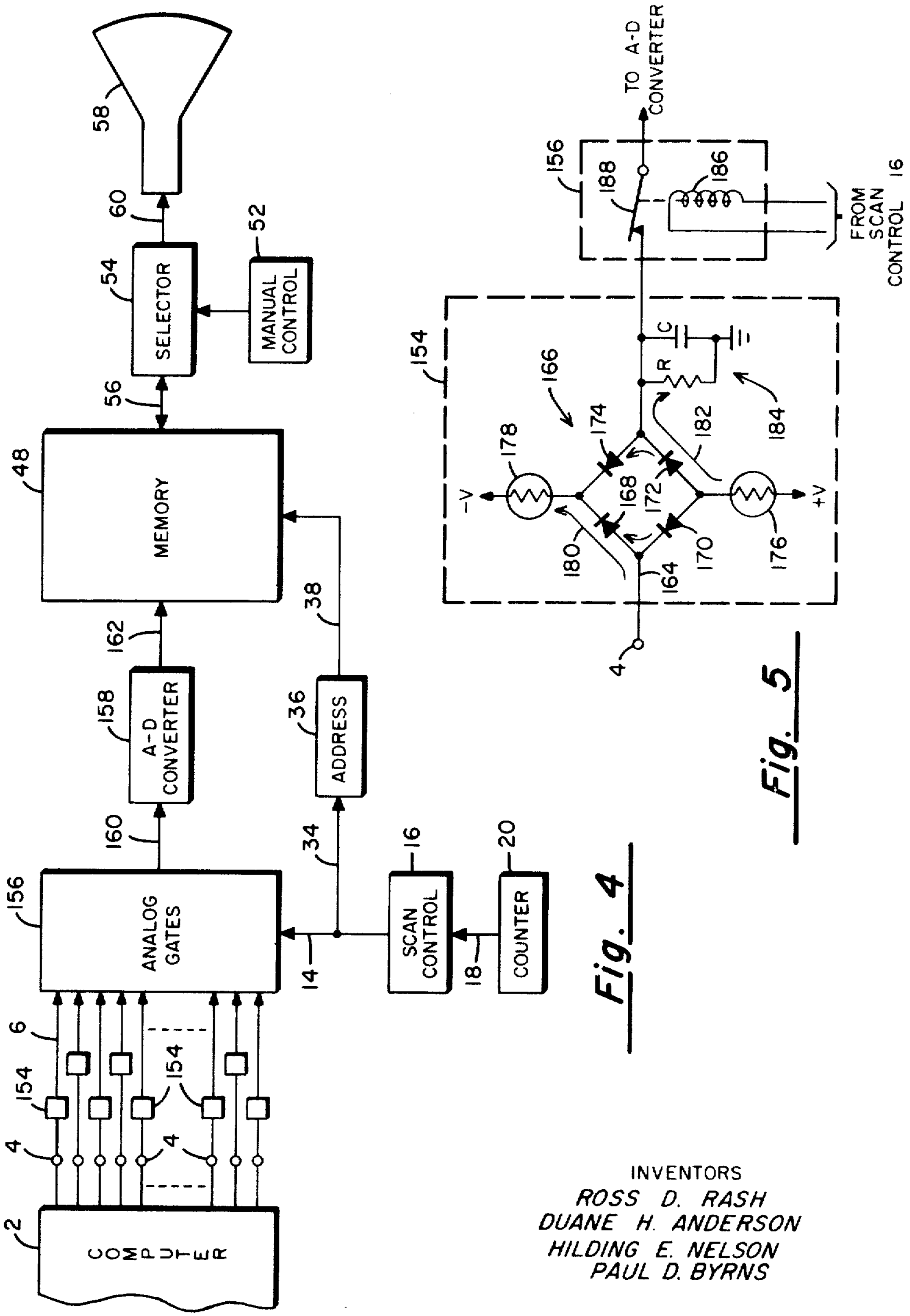
FIG. 4 discloses a second embodiment of the present invention in which R.C. time constant circuits and analog gates are utilized in place of digital equipment.
FIG. 5 discloses the circuit details of the R.C. time constant circuits as well as the analog gates shown as Blocks in FIG. 4.

In the embodiment shown in FIG. 4, the need for the Temporary Storage Memory is avoided through the use of analog circuitry rather than digital circuitry. Thus, Computer 2 may be producing electrical signals on several hundred different signal producing channels 4 which carry electrical loads in varying degrees. Locations 4 are coupled to RC time constant circuits 154 which are utilized to store the electrical signals from locations 4. The output of each of the RC time constant circuits 154 is coupled via line 6 to analog gate circuit 156. Analog gate circuit 156 couples the signals on only one of the lines 6 to A-D converter 158 via line 160 depending upon the signals present on line 14 from Scan Control 16. Again, Scan Control 16 is driven by the signals on line 18 from Counter 20.

Again, it should also be noted that the output of Scan Control 16 which is used to select a particular analog gate in circuit 156 which will couple a particular line 6 from Central Processing Unit 2 to the A-D Converter 158 is also coupled via line 34 to Address Register 36. The output from Address Register 36 on line 38 is coupled to the Main Memory Storage Unit 48. Thus, as before, it can be seen that any signals from Scan Control 16 which are used to select the signals on a particular line 6 from the Central Processing Unit 2 is also used through Address Register 36 to select a particular area in the Main Computer Memory Storage Unit 48.

The A-D Converter 158 is old and well known in the art and therefore will not be discussed in detail here. Suffice it to say that the digital signals on the output line 162 from A-D Converter 158 are coupled to that particular address in Memory which is present on line 38. Again, therefore, the data at any particular address in Memory 48 which has been selected by Scan Control 16 is regularly updated by any incoming data on a particular line 6 selected by the Analog gates 156.

The remainder of the circuit operates similar to that discussed for the circuit shown in FIG. 1. Thus, the data from the various computer channels is placed in the main computer memory 48 in a 256-byte area. This area is again composed of 8, 32-byte, groups. Again, any one of the 32-byte groups may be selected by the operator utilizing manual control 52 on channel selector 54 which causes the selected byte to be transferred to Channel Selector 54 via line 56. Channel Selector 54 is then so coupled to cathode-ray tube 58 via line 60.

FIG. 5 discloses the circuit details of the RC time constant circuits 154 as well as a typical one of the analog gates in circuit 156.

Terminal 4 represents one of the particular channels coupled to computer 2 shown in FIG. 1 and the signals thereon are coupled via line 164 to bridge circuit 166. Bridge Circuit 166 is comprised of diodes 168, 170, 172 and 174 as well as current sources 176 and 178. Without any signal present at terminal 4, the bridge is balanced and current flows equally through each leg of the bridge, i.e. through diodes 168 and 170 and diodes 172 and 174. However, assuming the input signal on terminal 4 is positive, diode 170 is reversed biased and therefore blocks any current flow through that leg of the bridge. Thus, diode 168 conducts heavily and the current from current source 178 flows through diode 168 in the direction shown by arrow 180 towards terminal 4. Now, the voltage drop across source 178 reverse biases diode 174 and thus the current from source 176 flows through diode 172 in the direction shown by arrow 182 and completes the circuit path through the RC time constant parallel path designated 184. Thus, the RC time constant circuit 184 will become an analog storage device storing the analog value of the digital signals on line 164 from terminal 4. These signals are then coupled from RC circuit 184 through analog gate 156 to the A-D Converter. It is obvious that if the RC time constant is long enough, it will store the average value of the signal activity present on line 164 from terminal 4. By making this time constant long enough, it will, of course, act as a temporary memory storage and, for this reason, the temporary memory storage unit 40 shown in FIG. 1 could be eliminated. Analog gate circuit 156 shown in FIG. 4 comprises a plurality of units such as those shown in FIG. 4 wherein coil 186 opens and closes switch contact 188 electromagnetically. There would, of course, be as many coils 186 as there were RC time constant circuits 154 and the manner in which the particular coil 186 is selected has already been described with relation to the scan control circuit 16 shown in FIG. 1.

Thus, there has been disclosed an instrumentation circuit which can measure the activity of all major data paths in a system against a time interval with the instrumentation dynamically recording the average percentage of utilization against the maximum potential of the data path.

It is understood that suitable modifications may be made in the structure as described and disclosed provided that such modifications come within the spirit and scope of the appended claims. Having now, therefore, fully illustrated and described our invention, what we claim to be new and desire to protect by Letters Pat. is:

We claim:

1. A systems activity monitor comprising:
a. means for sequentially sampling signals on a plurality of signal paths over a time interval for signals of a specified state,
b. a plurality of storage registers equal in number to the signal paths and each of which has a storage capacity capable of storing only the maximum number of samples that could be taken from a corresponding signal path during said time interval, and
c. means coupled to said sampling means and said registers for coupling the actual number of those samples taken from each signal path during said time interval which reveals said specified signal state to a corresponding register whereby the sample count in each register at the end of said time interval represents the ratio of the number of samples revealing a specified signal state to the maximum number of samples taken.

2. A systems activity monitor comprising:
a. means for sampling signals from a plurality of signal paths to be monitored,
b. means for establishing a time interval during which said signals may be sampled, and
c. means coupled to said first and second means for storing the number of signals sampled during said time interval to obtain the utilization of each of said signal paths expressed as a number which represents the ratio of the number of samples revealing a signal with respect to the total number of samples taken during said time interval.

3. A systems activity monitor for a signal producing device having N signal channels and a main storage memory, said monitor comprising:
a. temporary storage memory having at least N areas in each of which specified signal data can be stored as a digital number, each of said areas including a storage register having a plurality of stages,
b. scanning means coupled to said temporary storage means and the signal producing device for sequentially coupling detected signals from the N signal channels in said device to corresponding ones of said storage registers in said temporary memory over a selected time interval whereby a digital number is stored in each storage register which represents the ratio of the number of samples revealing a specified signal compared to the total number of samples taken, and
c. clock means coupled to said temporary storage memory and said main storage memory for enabling said digital numbers stored in each of said storage registers to be transferred to corresponding areas in the main storage memory only after the expiration of said time interval.

4. A systems activity monitor as in claim 3 further including:
a. means for driving said scanning means at a frequency different from the frequency of said signals coupled from said N signal channels whereby errors due to synchronism between said coupled signals and said scanning means are minimized.

5. A systems activity monitor as in claim 4 wherein said driving means comprises:
a. a random clock generator coupled to said scanning means for driving said scanning means in such a manner as to eliminate synchronism between said coupled signals and said scanning means.

6. A systems activity monitor as in claim 3 further including:
a. a visual display device, and
b. means coupling said visual display device to said main storage memory for displaying the signal activity of selected groups of said N areas represented by said stored digital numbers in the form of analog bar graphs.

7. A systems activity monitor as in claim 6 wherein said visual display coupling means comprises:
a. a signal display selection register coupled to said main storage memory and having a first and a second portion, said selection register causing data to be read-out of said main storage memory at a particular address determined by the data stored therein,
b. manual control means coupled to said first portion for changing the data stored therein to select a desired group of said signals in said N areas to be read-out from said main storage memory,
c. means coupled to said second portion of said selection register and to said visual display device to sequentially and repeatedly change the data stored therein whereby the data stored in each area in said selected group is sequentially and repeatedly read-out in synchronism with the horizontal position of a corresponding bar chart on said display device, and
d. means coupled to said main storage memory and said visual display device for sequentially receiving the read-out data from said main storage memory representing the data stored in said selected group of channels and causing a bar chart to be displayed for each channel in the selected group.

8. A method of monitoring the signal activity of a data path comprising the steps of:
a. establishing a time interval during which the data path signals may be sampled,
b. sampling the signals received during said time interval at such a rate that if all samples indicate a signal is present, the data path is considered 100 percent active, and
c. recording the number of samples indicating a signal is present whereby the percent activity of said path may be obtained.